April 3, 1945.    R. A. WHITAKER    2,372,697
GLOVE
Filed Nov. 14, 1942    2 Sheets-Sheet 1
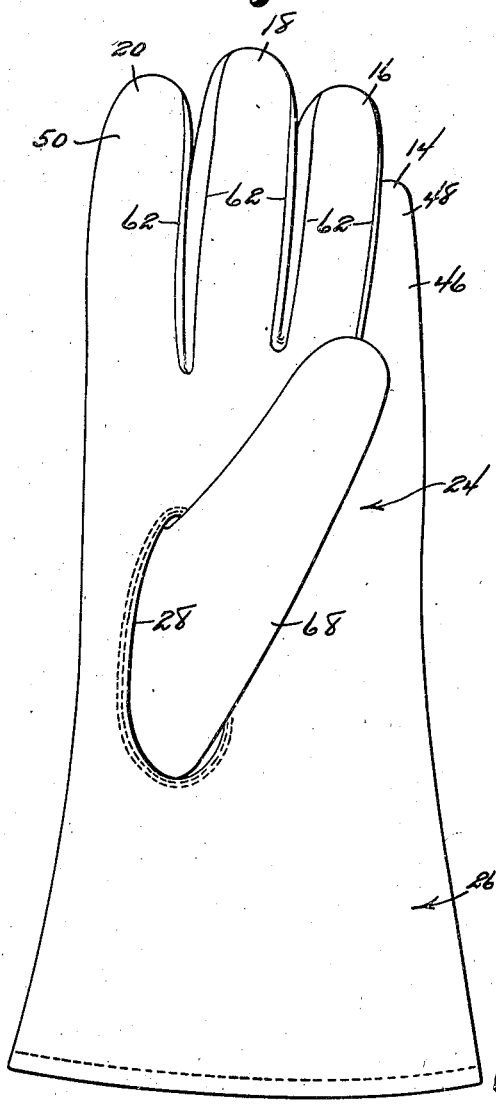
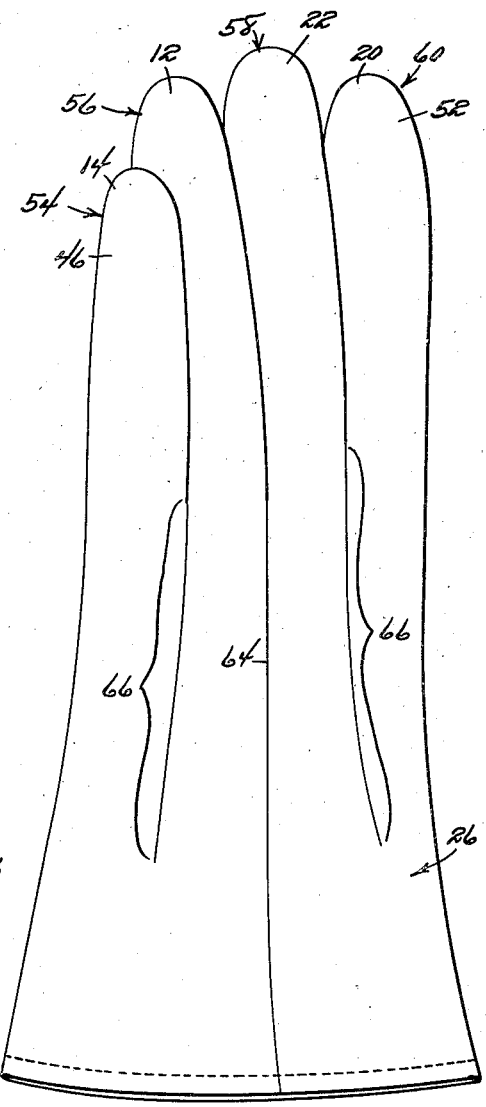
Reuben A. Whitaker INVENTOR.
BY
Victor J. Evans & Co.
ATTORNEYS

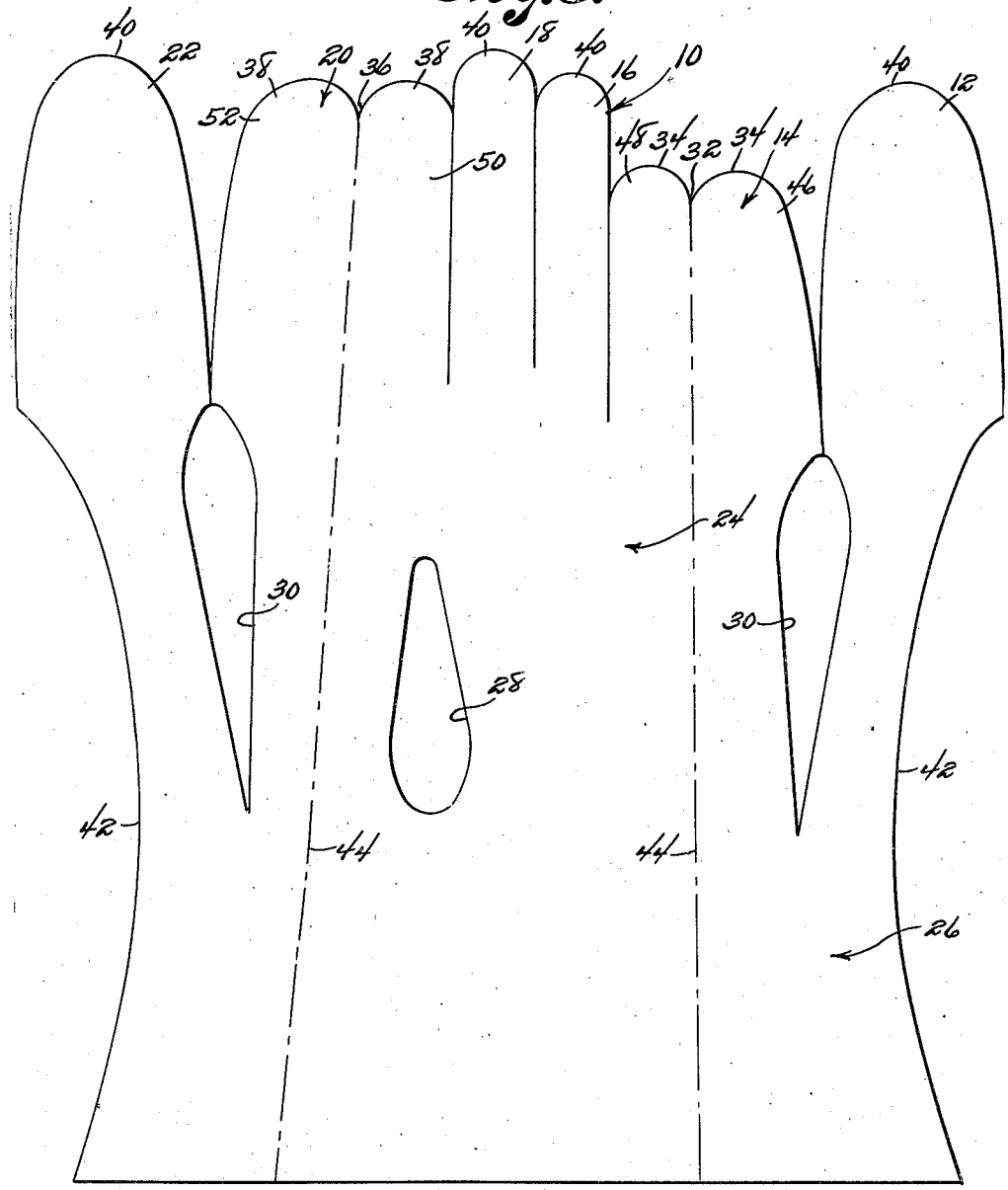

Patented Apr. 3, 1945

2,372,697

UNITED STATES PATENT OFFICE 2,372,697

GLOVE

Reuben A. Whitaker, Gloversville, N. Y.

Application November 14, 1942, Serial No. 465,613

2 Claims. (Cl. 2—169)

My invention relates to gloves, and has among its objects and advantages the provision of an improved glove of the one-piece type.

An object of my invention is to provide a glove which may be easily cut in the form of a blank and then folded and sewed along predetermined lines to form all the fingers, with the exception of the thumb, wherein the blank is so cut as to eliminate the necessity of fourchettes, as well as quirks, in which the glove may be manufactured at a low cost in that the amount of silk thread and sewing are greatly reduced, and in which the glove is well shaped with respect to form, in addition to being devoid of side seams which rip easily.

In the accompanying drawings:

Figure 1 is a front face view of the glove.

Figure 2 is a back face view, and

Figure 3 is a view of the blank before it is folded.

In the embodiment of the invention selected for illustration, Figure 3 illustrates a blank 10 cut to provide finger parts 12, 14, 16, 18, 20 and 22. The blank also includes a palm area 24 and a wrist portion 26. A thumb opening 28 is cut in the blank, as well as two openings 30 for gathering purposes. The line of separation between the finger parts 12 and 14 runs into one of the openings 30, while the line of separation between the finger parts 20 and 22 runs into the other opening 30.

In Figure 3, the finger part 14 is of double width and is notched at 32 to form convexed tips 34. The finger part 20 is also of double width, as well as being notched at 36 to form convexed tips 38. Similar convexed tips 40 are formed on the finger parts 12, 16, 18 and 22. The edges 42 of the blank 10 are concaved throughout the length of the wrist portion and up to the inner ends of the respective finger parts 12 and 22.

To shape the glove, the blank 10 is folded along two lines 44, which diverge slightly from the finger portions and along the palm area 24 and through the wrist portion 26. These lines of fold respectively pass through the deepest points of the notches 32 and 36. The line of fold 44 through the finger part 14 divides the latter into finger areas 46 and 48, while the other line divides the finger part 20 into finger areas 50 and 52.

After folding along the lines 44, the finger part 12 and the finger area 46 respectively overlie the finger part 16 and the finger area 48; and the finger part 22 and the finger area 52 respectively overlie the finger part 18 and the finger area 50. The finger area 48, the two finger parts 16 and 18 and the finger area 50 respectively provide the front faces of the little finger 54, the ring finger 56, the middle finger 58, and the index finger 60. The front faces of the fingers are narrower than their rear faces, and the overlying parts of the fingers are stitched together along their edge margins to provide the finished fingers, as along lines 62, with the edge margins lying inside the fingers.

The glove is finished by sewing together the meeting edges 42, and the edges of the openings 30 are brought together and sewed, so that the finished glove takes the appearance of Figures 1 and 2. The seam 64 which connects the edges 42 extends longitudinally of the glove centrally of its back, as shown in Figure 2. The seams closing the openings 30 are indicated at 66.

The thumb 68, which may be of conventional design, is sewed to the edge margins about the opening 28.

Without further elaboration, the foregoing will so fully explain my invention, that others may, by applying current knowledge, readily adapt the same for use under various conditions of service.

I claim:

1. A glove comprising an approximately rectangular blank shaped at its outer edge to form six longitudinally divided finger parts with the finger parts immediately inwardly of the end parts being notched to provide the complementary ends of a finger, the inner edge of the blank opposite said outer edge being straight, the side edges of said blank from the inner ends of the finger parts to the inner straight edge having an inward curvature, said blank being folded inward along straight longitudinally directed lines diverging from said notches at the outer to the inner edge, the blank being provided with a thumb opening intermediate said fold lines, the complementary edges of the overlapping finger parts being secured in finger forming relation with the curved side edges secured to form a seam assuming an approximately straight line along the back of the glove.

2. A glove comprising an elongated approximately rectangular blank shaped at its outer end to form six fingers divided by longitudinally directed slits with the finger parts immediately inward of the outermost parts being notched to provide the complementary ends of a finger, the opposite inner end edge of the blank being approximately straight, the side edges of said blank from the inner ends of said outermost finger parts to the inner straight end edge having an inward curvature, said blank being folded inward along straight longitudinally directed lines diverging from said notches at the outer end to the inner end edge, the blank being provided with a thumb opening intermediate said fold lines and with a pair of openings elongated in a direction substantially parallel with the fold lines extending from the inner ends of the slits between the outermost finger parts and the parts next thereto to a point short of the inner straight edge, the complementary edges of the overlapping finger parts being secured in finger forming relation with the side inwardly curved edges secured together to form a seam assuming an approximately straight line along the back of the glove and the edges of said pair of elongated openings being secured together to form a hand conforming shape.

REUBEN A. WHITAKER.